Oct. 4, 1927.   
F. E. BEST  
GOVERNOR MECHANISM  
Filed Dec. 28, 1921  
1,644,167
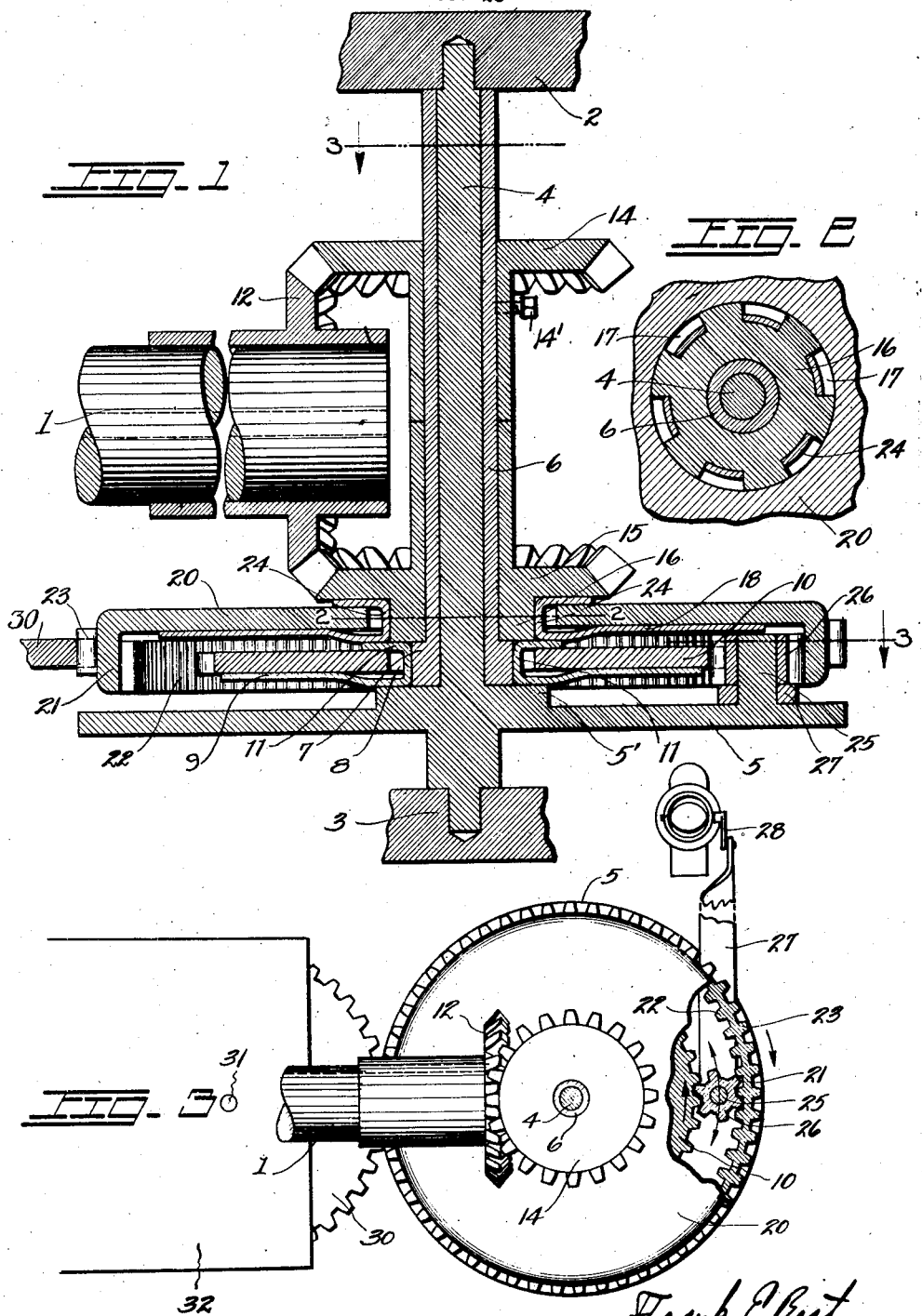
Frank E. Best.  
INVENTOR Patented Oct. 4, 1927.

1,644,167

UNITED STATES PATENT OFFICE.

FRANK E. BEST, OF SEATTLE, WASHINGTON.

GOVERNOR MECHANISM.

Application filed December 28, 1921. Serial No. 525,316.

This invention relates to improvements in governor mechanism, and more particularly to a mechanism of that character especially useful in connection with gas, oil, steam, or other types or engines, for the purpose of maintaining the engine at a constant speed of operation regardless of any variation of the load that may be placed thereon.

It is the principal object of the invention to provide a governor mechanism of the above character that is operated jointly under the control of the engine with which it is attached, and a motor mechanism that operates at a constant speed and which is independent of the engine.

A further object is to provide a device of this nature in which two rotatably mounted members are both driven from a common driving member by means including a friction drive and in which one only of said rotatably mounted members is further provided with independent driving mechanism which is the dominating drive to said rotatably mounted member and forces a slippage between it and the frictionally connected driving member in case the driving member varies from a constant speed.

More specifically stated, it is the object of the invention to provide a speed control mechanism embodying, in its construction, a planetary gear system wherein the external and internal gears are driven in opposite directions by a friction connection with the engine, and the intermediate gear is mounted upon a movable means which is connected with the control valve which regulates the flow of fuel to the engine, and to provide means whereby the external gear may be controlled so as to rotate at a certain predetermined and constant speed by a motor that is independent of the engine, so that as long as the engine is operating the internal gear at a certain desired speed, as compared to the rate of operation of the external gear, the intermediate gear will have no planetary movement, but should the internal gear, due to varying of conditions or change of the load on the engine, be driven faster or slower, the said intermediate gear will be caused to planetate accordingly and, in moving, will effect adjustment of the fuel control valve to admit more or less fuel as is needed to maintain the engine at the desired speed.

Other objects of the invention reside in the details of construction of the various parts of the mechanism and in their specific arrangement in connection with the driving mechanisms.

In accomplishing these and other objects of the invention, I have provided the improved details of construction, the preferred forms of which are illustrated in the accompanying drawings, wherein—

Figure 1 is a central, sectional view of a governor mechanism constructed according to the present invention.

Figure 2 is a fragmental, sectional view taken on the line 2—2 in Figure 1.

Figure 3 is a sectional face view on a reduced scale, taken on the line 3—3 in Figure 1.

Referring more in detail to the drawings—

1 designates what may be the end portion of the crank shaft of an engine of the internal combustion type as used in automobiles, or it may be any other shaft that is rotatably driven by direct connection with the engine.

Supported in a suitable frame comprising upper and lower bearings, as indicated at 2 and 3, is a rotatable post 4 which, about its lower end portion, has a base plate 5 cast therewith and which extends in a plane that is perpendicular to the post. Fitted rotatably about the post, and extending between the plate 5 and bearing 2, is a sleeve 6 provided at its lower end with an annular flange 7 wherein there is a plurality of peripheral notches 8.

Supported upon a central hub portion 5' of the plate 5, and concentrically about the post 4, is a friction disk 9 and, supported upon this disk and also concentrically about the post, is a gear wheel 10 which is the internal gear of the planetary system. The disk 9 has a series of fingers 11 forming a hub, bearing portion, and these extend upwardly and are dovetailed into notches 8 into the lower end of the sleeve 6 and are then turned outwardly to overlie and bear against the upper face of the gear wheel 10 so that the latter is held in a friction driving connection.

Keyed, or otherwise fixed on the shaft 1, is a gear wheel 12 and mounted on the sleeve 6, are two gears 14 and 15 which mesh with the gear 12 and are driven in opposite directions thereby; the gear 14 being fixedly secured as by a set screw 14' on the sleeve while the gear 15 is freely rotatable on said sleeve.

On the under side of the gear 15 is an extended hub portion 16, provided with a plurality of peripheral notches 17 as shown in Figure 2. A disk 18, similar to the disk 9, is mounted about the hub 16 and this supports a wheel 20 having a peripheral, downturned flange 21 provided internally and externally with gear teeth, as shown respectively at 22 and 23. The disk 18 has hub forming fingers 24 extending upwardly and dovetailed into the notches 17, and then turned outwardly at their upper ends to overlie the upper face of the wheel 20 to bear frictionally thereagainst for the purpose of assisting in rotating the same, but having no fixed driving connection therewith.

On the plate 5 is a stud 25 and, mounted rotatably thereon, is a pinion 26 which is the intermediate gear of the planetary system and operates in mesh with the gear teeth 22 and with the teeth of the gear 10. Also, connected with the stud 25, is one end of a link 27 which, at its opposite end, connects with a valve operating lever 28 which, for the purpose of illustration, has been shown to be the throttle lever of a carburetor. Movement of the lever controls the flow of fuel to the engine with which the governor device is used, and, in this manner, regulates the speed of operation.

Operating in mesh with the external teeth of the wheel 20, is a gear wheel 30. This is mounted on a shaft 31 which has a driving connection with a constant speed driving mechanism such as a clock or the like, that is indicated at 32, and which is the dominating drive for the gear 20 and is capable of forcing a slippage between the gear 20 and its supporting disk 18 so that the gear at all times rotates at the same speed. The gear ratio of the device is such that, with the engine operating at a certain desired speed, and the clock mechanism regulating the speed of the gear 20, the pinion 26 which operates in mesh with both the clock control and the engine driven gears, will be retained against planetary movement, but should the engine slow down or speed up, due to any change in conditions under which it is operating, the internal gear will slow down or move faster accordingly and this will effect a planetary movement of the gear 26 which will, in turn, effect movement of the link 27 which will open or close the throttle of the carburetor and, in this way, admit more or less fuel to the engine as is needed in order that it will maintain the desired speed.

It is apparent that the device could operate in the same manner as described without a driving connection being effected between the engine and the gear wheel 20, but such a connection is desired because the clock mechanism provided is thereby assisted. The gear 15 will tend at all times to drive the gear 21 at a higher speed than said gear 21 can be driven by the gear 30 thus ordinarily relieving the constant speed mechanism of the necessity of supplying driving power and making it only necessary for said constant speed mechanism to exert a retarding effect.

It is apparent that a speed control device of this character can be used on internal combustion engines, steam engines or other engines of other type.

Having thus described my invention, what I claim as new therein and desire to secure by Letters-Patent, is:—

1. In combination, a driven shaft, a speed controlling device, a governor member driven from said driven shaft at a speed that varies directly as the speed of said driven shaft, another governor member having a frictional driving connection with said driven shaft, independent constant speed mechanism for retarding said last named governor member to a constant speed and devices actuated by a change of speed of said first named governor member relative to said last named for adjusting said speed controlling device.

2. In combination, a driven shaft, a speed controlling device, a gear wheel connected with said driven shaft and arranged to be rotated at a speed that varies directly with the speed of said driven shaft, another gear wheel frictionally connected with said driven shaft, constant speed independent mechanism connected with and arranged to retard said last named gear wheel to a constant speed of rotation by forcing a slippage of the driving means of the same and means actuated by a change in the relative speeds of said two gear wheels for regulating said speed controlling device.

3. In combination, a driven shaft, a speed controlling valve, a gearwheel driven by said driven shaft at a speed that varies directly with the speed of said driven shaft, a larger internal gear having a frictional driving connection with said driven shaft whereby it will tend to be driven by said driven shaft at the same angular velocity than said first named gearwheel, independent constant speed mechanism arranged to retard said internal gear to a constant speed and a planet pinion connected with said speed controlling valve and rotatable between said gearwheel and said internal gear for regulating the opening of said valve in response to variations in the relative speed of said gearwheel and said internal gear.

4. In combination a driven shaft, a control valve, speed control mechanism comprising a rotatably supported post having a gear supporting flange formed thereon, a sleeve rotatable on the post and provided at one end with a flange having peripheral notches therein, a gear mounted on the sleeve, a gear on the driven shaft meshing with the sleeve gear, a gear mounted about the notched flange of the sleeve, a supporting disk for the said gear supported from the post flange and having hub forming fingers extending within the notches of the sleeve flange and turned laterally to overlie the upper face of the gear to retain the latter in a friction connection for rotation by the sleeve, a ring gear concentric with the latter gear having internal and external teeth, a supporting means for the latter gear, a constant speed motor having geared connection with the external teeth of the ring gear whereby the latter is rotated oppositely to the direction of the inner gear, a stud formed on the gear supporting flange, a pinion mounted on the stud in mesh with the external and internal gears and a link connected with the stud and with the control valve whereby planetary movement of the pinion in opposite directions effects opening or closing movement of the valve.

Signed at Seattle, Washington, this 22 day of December, 1921.

FRANK E. BEST.